United States Patent [19]
Olzak et al.

[11] Patent Number: 5,500,518
[45] Date of Patent: Mar. 19, 1996

[54] MEMORY CARD INCLUDING EXTRACTION/RETENTION ARRANGEMENT

[75] Inventors: Richard A. Olzak, Kirkland; James L. Collier, Renton; Robert D. Caney, Maple Valley, all of Wash.

[73] Assignee: AlliedSignal Inc., Morristown, N.J.

[21] Appl. No.: 341,383

[22] Filed: Nov. 17, 1994

[51] Int. Cl.⁶ ................................................. G06K 7/10
[52] U.S. Cl. ........................................ 235/492; 235/487
[58] Field of Search ................................. 235/472, 487

[56] References Cited

U.S. PATENT DOCUMENTS 5,330,360  7/1994  Marsh et al. ........................... 235/492

Primary Examiner—Harold Pitts

[57] ABSTRACT

An extraction/retention arrangement for use with a PCMCIA (Personal Computer Memory Card International Association) card features a tag which is attached to the card to provide for hand extraction of the card from a computer drive mechanism. The tag includes protrusions to prevent accidental extraction of the card by latching behind an interior lip of the drive mechanism, while enabling finger grip extraction of the card as is desired. The tag carries orientation indicia to insure that the card is properly inserted in the drive mechanism.

10 Claims, 1 Drawing Sheet

MEMORY CARD INCLUDING EXTRACTION/RETENTION ARRANGEMENT

BACKGROUND OF THE INVENTION

This invention relates generally to PCMCIA (Personal Computer Memory Card International Association) cards and, more particularly, to PCMCIA cards having an extraction/retention arrangement associated therewith.

PCMCIA cards are enjoying ever increasing usage. Several problems are attendant to this usage. For example, it will readily be understood that once a card is inserted into a computer drive housing, it cannot be readily removed therefrom if the drive housing does not include a mechanical ejection arrangement, as is often the case. Moreover, the cards can be inadvertently dislodged from the drive housing, and hence can possibly be damaged or lost if a hand held drive unit is, for example, dropped by a user. Also, the cards must be inserted into the drive housing "right side up" in order not to be damaged, or to avoid disabling the computer. The proper orientation of PCMCIA cards can be difficult to ascertain in some work environments, particularly such as under reduced light conditions.

The present invention tends to avoid these problems and others which have heretofore been associated with the use of PCMCIA cards.

SUMMARY OF THE INVENTION

This invention contemplates a PCMCIA card including an extraction/retention arrangement associated therewith, wherein a flexible tag is attached to the card via an adhesive surface on the tag. The tag includes finger grips to facilitate removal of the card from a computer drive housing and includes protrusions which latch behind the interior lip of the drive housing to prevent accidental disengagement of the card therefrom. The protrusions have sufficient impact resistance to overcome disengaging shock loads, yet are flexible enough to insure that the card is hand-removable. Indicia are provided on the card to enhance proper orientation of the card in low light environments as well as to provide obtrusive orientation instructions in normal light environments.

DETAILED DESCRIPTION OF THE INVENTION

Figure 1:
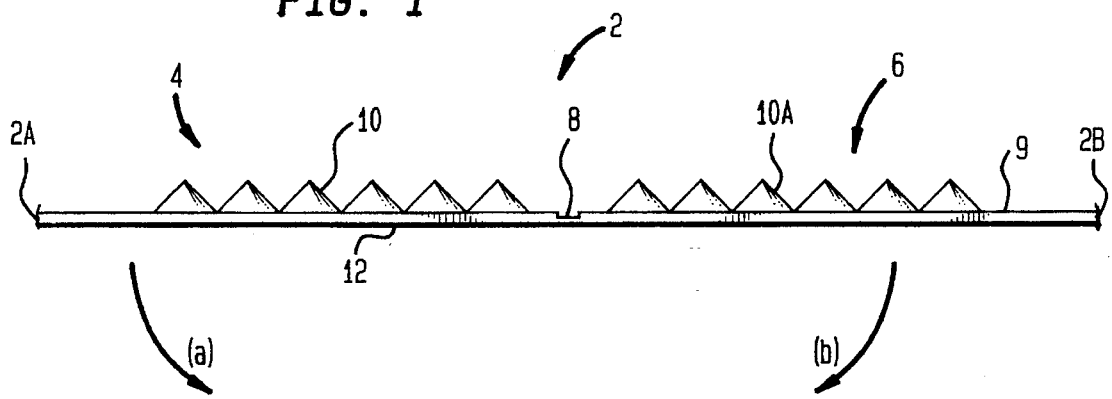
FIG. 1 is a diagrammatic side view representation of an extraction/retention tag according to the invention.

A tag according to the invention is designated by the numeral 2. Tag 2 is a flat, flexible, strip-like member having one section 4 and another section 6. Sections 4 and 6 are separated by a natural hinge 8 so that the tag sections are foldable toward each other in the direction of arrows (a) and (b), respectively, shown in FIG. 1. In this regard, it is noted that tag 2 may be molded of a material such as polyurethane and is approximately 0.015 inches thick.

A surface 9 of tag 2 carries two corresponding pluralities of raised finger grips 10 and 10A. One such plurality of finger grips 10 is on tag section 4 and the other plurality of finger grips 10A is on tag section 6. Finger grips 10 and 10A are in the form of parallel bar-like members which are triangular in cross-section and are approximately 0.063 inches high, and extend in spaced relation transversely across surface 9 of tag 2. Each such plurality of finger grips 10 and 10A extends in opposing relation away from natural hinge 8 toward respective opposite ends 2A and 2B of tag 2.

An opposite surface 12 of tag 2 has a suitable adhesive thereon. Adhesive surface 12 has a release paper covering (not otherwise shown) for protection purposes prior to use, as will be readily appreciated.

Figure 2:
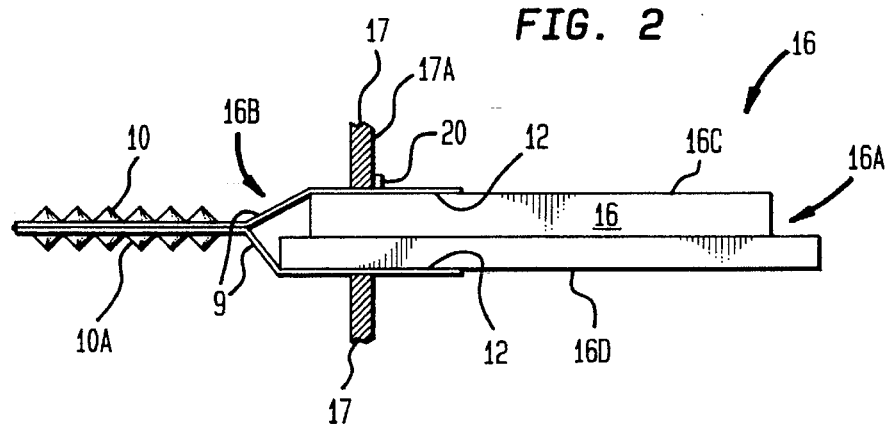
FIG. 2 is a diagrammatic side view representation illustrating a PCMCIA card with the extraction/retention tag shown in FIG. 1 attached thereto.
Figure 3:
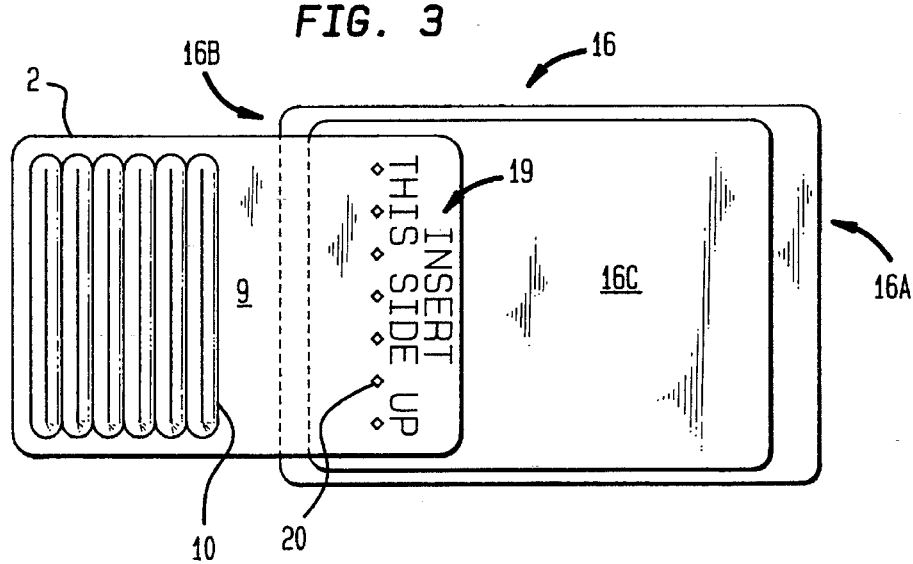
FIG. 3 is a diagrammatic plan view representation illustrating the PCMCIA card shown in FIG. 2 with the extraction/retention tag shown in FIG. 1 attached thereto.

With particular reference to FIGS. 2 and 3, a conventional PCMCIA card is designated by the numeral 16. The front or socket end of card 16 is designated by the numeral 16A and the opposite end is designated by the numeral 16B. Card 16 may be of types I, II or III, as will be understood by those skilled in the art. Card 16 has a top surface 16C and a bottom surface 16D.

Tag 2 is folded around card 16 so that adhesive surface 12 (with the release paper covering removed) of tag 2 adheres to top 16C and bottom 16D of card 16 near end 16B thereof. Finger grips 10 and 10A thereupon extend in opposing relation to each other. The finger grips are pressed together so that the areas of the two finger grip pluralities on tag surface 9 adhere to each other via tag surface 12 to provide a unitary finger grip area extending beyond end 16B of card 16 as particularly shown in FIGS. 2 and 3.

A plurality of flexible protrusions 20 extend in spaced and aligned relation transversely across surface 9 of tag 2 behind finger grip plurality 10 on surface 9. Side 16C of card 16 is intended to face upwardly upon insertion of the card into a computer drive mechanism 17 of the type having an interior lip 17A as shown in FIG. 2.

The arrangement of protrusions 20 is particularly shown in FIG. 3. The protrusions are sufficiently rigid so as to latch behind interior lip 17A of drive unit 17 to inhibit accidental disengagement of the card therefrom. However, the protrusions are sufficiently flexible so that card 16 can be extracted from drive mechanism 17 by gripping the finger grip area formed by finger grip pluralities 10 and 10A on tag 2 and thereafter pulling on the tag.

Protrusions 20 extend approximately 0.095 inches above side 9 of tag 2.

A suitable legend 19 is embossed or otherwise provided on side 9 of tag 2 so as to indicate which side of the card must face upwardly when inserting the card into the computer drive mechanism.

There has thus been described an extraction/retention arrangement for use in association with a PCMCIA card wherein a tag having finger grip areas adhesively attaches to the card to provide for finger grip removal of the card from a computer drive mechanism. Flexible protrusions are incorporated on the tag so as to prevent accidental disengagement of the card by latching behind the interior lip of the drive mechanism. The protrusions have sufficient flexibility to insure that the memory card is hand-extractable from the drive mechanism. Insertion mode indicia enhances use of the extraction/retention arrangement in low light conditions and provides as well obtrusive insertion instructions which are advantageous in normal environments.

With the above description of the invention in mind, reference is made to the claims appended hereto for a definition of the scope of the invention.

What is claimed is:

1. A computer memory card extraction/retention arrangement, comprising:

a flexible tag having one surface and an opposite adhesive surface;

the tag having first and second sections separated by a natural hinge, whereby the adhesive surfaces of the first and second sections are displaceable toward each other;

each of said first and second sections having finger grip means on the one surface thereof, each of said finger grip means extending outwardly from the natural hinge toward a respective end of the tag;

said tag being folded around a memory card when the adhesive surfaces of the first and second tag sections are displaced toward each other, whereupon said adhesive surfaces adhere to a top and a bottom of the memory card on an end of said card opposite a socket end, and each of said finger grip means is joined via the adhesive surfaces to form a unitary finger grip area extending beyond the opposite card end for grasping the card and for hand extracting said card from a computer drive unit; and means disposed on the one tag surface for lodging behind an internal lip of the computer drive unit for inhibiting accidental extraction of the card from said unit.

2. The arrangement described by claim 1, wherein each of said finger grip means includes:

a plurality of bar-like members which extend in parallel spaced relation transversely across the one tag surface.

3. The arrangement described by claim 1, wherein the means disposed on the one tag surface for lodging behind a lip on the computer drive unit includes:

a plurality of protrusions which extend in aligned spaced relation transversely across the one tag surface behind the unitary finger grip area;

said protrusions being sufficiently flexible so that the card can be hand extracted from the drive unit via the unitary finger grip area, and being sufficiently rigid to inhibit accidental extraction from said drive unit.

4. The arrangement described by claim 1, wherein:

the one surface of the tag carries card orientation indicia for enabling proper insertion of the card into the drive unit.

5. A computer memory card extraction/retention arrangement, comprising:

a tag attached to a memory card at the end of said card opposite the socket end thereof, and having one surface and an opposite surface;

said tag having an end extending beyond said opposite end of said card;

finger grip means disposed on the opposite surface of the tag on the extending end thereof for grasping the card and for hand extracting said card from a computer drive unit; and means disposed on said opposite tag surface for lodging behind an internal lip of said computer drive unit for inhibiting accidental extraction of the card from said unit.

6. The arrangement as described by claim 5, wherein:

the tag has first and second sections each of which has an adhesive surface and an opposite surface;

said first and second sections separated by a natural hinge whereby the adhesive surfaces of the first and second sections are displaceable toward each other; and said tag being folded around the memory card when the adhesive surfaces of the first and second sections are displaced toward each other, whereupon said adhesive surfaces adhere to a top and a bottom of the memory card on the opposite card end.

7. The arrangement as described by claim 6, wherein the finger grip means includes:

first and second corresponding pluralities of finger grips on the opposite tag end and joined via the adhesive surfaces to form a unitary finger grip area extending beyond the opposite card end when said tag is folded around the memory card.

8. The arrangement as described by claim 7, wherein each of said first and second corresponding pluralities of finger grips includes:

a plurality of bar-like members which extend in parallel spaced relation across the opposite tag surface.

9. The arrangement as described by claim 7, wherein the means disposed on the opposite tag surface for lodging behind a lip of said computer drive unit for inhibiting accidental extraction of the card therefrom includes:

a plurality of protrusions which extend in aligned spaced relation transversely across the opposite surface of one of the first and second tag sections behind the unitary finger grip area;

said protrusions being sufficiently flexible so that the card can be hand extracted from the drive unit via the unitary finger grip area, and being sufficiently rigid to inhibit accidental extraction from said drive unit.

10. The arrangement as described by claim 5, wherein:

the opposite surface of one of the tag sections carries card orientation data for enabling proper insertion of the card into the drive unit.

* * * * *